Feb. 16, 1965 D. W. ENOCH ETAL 3,169,395
RHEOLOGICAL TESTING MEANS AND METHOD OF
TESTING WHEAT FLOURS
Filed May 31, 1962 5 Sheets-Sheet 3

Inventors:
Gerald L. Scott
Duard W. Enoch and
Melvin M. Huber
By: Darbo, Robertson &
Vandenburgh Attys.

Feb. 16, 1965 D. W. ENOCH ETAL 3,169,395
RHEOLOGICAL TESTING MEANS AND METHOD OF
TESTING WHEAT FLOURS
Filed May 31, 1962 5 Sheets-Sheet 4

Fig.5

Inventors:
Gerald L. Scott
Duard W. Enoch and
Melvin M. Huber
By: Darbo, Robertson &
Vandenburgh  Attys

3,169,395
RHEOLOGICAL TESTING MEANS AND METHOD OF TESTING WHEAT FLOURS

Duard W. Enoch and Gerald L. Scott, Kansas City, Mo., and Melvin M. Huber, Overland Park, Kans., assignors to Interstate Bakeries Corporation, Kansas City, Mo., a corporation of Delaware
Filed May 31, 1962, Ser. No. 199,182
37 Claims. (Cl. 73—169)

This invention relates to testing means for determining the rheological properties of dough-like materials and more particularly (wheat) flour-water doughs for the making of bread and other bakery products. The invention also completes a method of testing wheat flour.

This application is a continuation-in-part of our copending application Serial No. 819,478, filed June 10, 1959, now abandoned.

It has been estimated that there are between twelve thousand and thirty thousand known varieties of wheat. Each variety of wheat will vary as to its characteristics, which in turn will be reflected in the characteristics of the flour produced from the wheat. Furthermore, the characteristics of the flour will be affected by numerous other factors. Among these are: the geographical area in which the wheat was grown; the time of year in which the wheat was grown, e.g. winter wheat, spring wheat, etc.; the climate of the growing season; the conditions under which the wheat was stored; the milling practices, i.e. how and to what extent the endosperm (flour) is separated from the bran and germ; etc. While it may be stated that essentially all flour is composed of moisture, ash, protein, gluten, fat, fiber, starch, etc., the characteristics and amount of each that is present will vary from one flour to another.

The milling of flour and the production of bakery goods therefrom has been traced back long prior to 2000 B.C. For many years bread has been a staple in the human diet. As one author puts it: "The universal favor in which bread is held as a food is largely due to its structure of thin-cell walls. This gives an enormous surface favorable fort the action of the organs of taste and the digestive juices. Hence, one very important quality in bread is the thinness of cell walls, coupled with small cell sides." These cells in bread are a result of the expanding carbon dioxide gas resulting from yeast growth. It is a prime requisite for good bread that the dough be of such a character that it retains the gas in the small pockets required to result in the small thin-walled cells in the finished product. The principal factor in the flour that affects this characteristic of the dough is the gluten. The character of the gluten determines the cell structure which can be obtained in the bread.

Each bakery item is best made utilizing a fluor with certain predetermined characteristics. However, even within the scope of the general characteristics that would indicate that a particular flour is most suitable for a particular bakery item, the exact characteristics of one flour will vary substantially from the exact characteristics of another. Thus, historically baking has been primarily a matter of human judgment. The baker, of course, would select a flour allegedly having the general characteristics most suitable for the particular item that he wished to bake. But, in mixing the dough he would exercise judgment as to the exact proportion of ingredients, mixing time and procedure, etc., so as to achieve the best possible product from the flour that he was using. The same has been true of the miller who produced the flour sold to the baker. For many years the flours sold commerically have been a blend of the flours derived from various wheats. A miller sought to blend the various flours to produce a composite commercial product which would have the characteristics desired for a particular baking purpose.

The problems occasioned by the reliance upon human judgment in carrying out these operations long have been recognized. For many years efforts have been made to produce reliable tests for evaluating the baking characteristics of a particular flour or blend of flours. The proposed tests have taken innumerable forms. Many of them are discussed in the book Modern Cereal Chemistry, by Kent-Jones and Amos, published by The Northern Publishing Co., Ltd., 5th edition (1957), particularly pages 138–160 and 323–365. The very multiplicity of proposed testing procedures indicates a general lack of statisfaction with any of them insofar as achieving the desired results is concerned. In recent times perhaps the most commonly used has been that carried out in the unit designated the Farinograph, either in its basic form or with certain modifications (see for example, Patent No. 2,974,524). Despite its limitations (see Modern Cereal Chemistry, supra, page 350), the Farinograph has been popular because it is easy to use and gives some, if not completely accurate or complete, information to aid in judging the quality of the flour for a particular purpose.

With today's emphasis on mechanization in the baking industry, as well as in other manufacturing operations, there is an even greater pressing need for a simple, reliable test which will accurately determine the characteristics of a given flour. Efforts already have been made to utilize continuous bread making operations. With these there is not the opportunity for a master baker to watch the progress of the dough from a particular batch of flour and adjust the ingredients or processing conditions to arrive at a suitable end product. Furthermore, even in ordinary bakery operations, a master baker having the requisite skills may be difficult to obtain and keep by an employer. If all of the conditions requisite to producing a suitable loaf of bread can be standardized, the work can be performed by less experienced help or automatically. Obviously, one of those conditions is the exact characteristics of the flour employed. A brief indication of the extent to which those characteristics will change already has been set forth herein, and amplification thereof can be found in the book Modern Cereal Chemistry, supra, or the book Wheat and Flour Quality, by Swanson, Burgess Publishing Co. (1938 and 1941). The principal object of the present invention is to provide a relatively simple, but more accurate test, for determining flour characteristics essential to baking and an apparatus for suitably performing the testing method.

It is well known that different flours have different capacities for absorbing water to yield a dough of a given consistency and that they have different capacities to withstand mixing. Variations in capacities to withstand mixing are referred to as variations in flour "strength." In general, the stronger the flour the greater the capacity to withstand mixing. It would be valuable to the baker to be able to accurately forecast flour strength by selecting and testing samples of flour intended to be used. Moreover, wheat flour as sold on the market is generally a blend of different flours, each having different "strength" characteristics and such forecasting would be of great assistance not only to the baker but also to the flour miller in aiding in blending wheat mixtures to achieve a desired strength. Variations in the baker's flour supply may require water absorption adjustments and mixing time determinations to obtain optimum dough consistency.

As flour is mechanically worked in the presence of water, rheological changes occur. At first, the flour mixture is lumpy and lacks homogeneity. Initial mixing with a suitable quantity of water produces a plastic, homogeneous mass. As mixing continues the hydrated gluten in the flour begins to develop its elastic properties. Continued mixing will finally cause the gluten to break down and the dough to lose its elastic properties and become a stringy, sticky mass. Various critical aspects of the rheological properties of flour-water-doughs have been impossible of determination by heretofore known means.

An important object of the present invention is the provision of means for testing a flour-water dough sample to positively determine, successively, the point of optimum dough development, the point of maximum dough elasticity, and the point of ultimate dough mixing capacity, or fatigue point, thereby providing valuable information as to optimum mixing time and water absorption capacity that eliminates guesswork and trial-and-error methods in the baker's procedures.

The present invention provides an improved and simplified apparatus for subjecting flour-water doughs to the successive stages of mix development while simultaneously recording various critical rheological characteristics of the mix. The testing mixer of the present invention is equipped with simple and effective means for translating mechanical movements resulting from the rheological changes of the mix to electrical impulses and graphically recording these in the form of a graph on a chart which may be removed from the apparatus and used for evaluation and consultation purposes. The information on the chart, that is, the rheological history of the dough-mix as expressed by the graph, is recorded as a function of time.

Furthermore, the novel method of testing here contemplated is markedly efficient and expeditious not only for flour millers but also for individual bakery establishments, which are hereby enabled to maintain a constant check on their procedures.

Additional advantages of our invention include: the parts of the apparatus of our invention may be fabricated readily and inexpensively from metals particularly suited to facilitating the cleaning of the apparatus after it is used, and the calibration of the machine, since the shapes are not complex, with compound curves, etc.; clean-up and cleanliness are facilitated by reason of the fact that there are no bearings or the like which normally are in contact with the dough when the machine is used; and the parts that actually engage the dough and perform the working function easily and inexpensively can be made as strong as is necessary to withstand the forces that have resulted in distortion problems with some types of prior art apparatus.

The invention will be understood by reference to the following description of an illustrative apparatus usable therewith and specimen graphs taken thereby. In the drawings—

Reduced to its barest essentials, our invention contemplates a method for the testing of flour in which the flour first is made into a dough. In the usual testing procedure this dough will be made from only the flour and water. However, in certain practices of the invention other ingredients may be included in the dough. Of course, the effect of additional ingredients upon the results obtained always must be taken into consideration in the interpretation of the results.

The percentage of ingredients employed in making the dough is adjusted or predetermined to produce a dough having a known or standardized consistency. The dough is then worked by pulling and stretching at a constant rate until the gluten in the flour fails completely. A substantial advantage is obtained if the dough is worked centrifugally (and by that we mean that portions, at least of the dough are moved in an arc at a rate of speed such that the dough will be thrown outwardly when the gluten fails) as well as in shear. At the same time, space should be provided about the dough when it is being worked so that it is free to move outwardly when the gluten fails.

During the period that the dough is worked, measurements are taken of the length of time required to (a) reach the point of optimum dough development, (b) reach the point of maximum dough elasticity and (c) reach the point of complete fatigue of the gluten. The information so obtained provides an accurate and reliable comparative indicator of the gluten characteristics and the usefulness of the flour for different baking purposes. The most significant information is the period of time between optimum dough development and maximum elasticity and between maximum elasticity and gluten fatigue. For example, if it is known that certain specific procedures, if followed, will produce a satisfactory product from one flour, these flour characteristics are set forth by the foregoing test, and an unknown or a second flour, having the same characteristics as set forth by the foregoing test, will produce a satisfactory product if the baking procedures of the first flour are followed. Thus, for example, a miller can blend a flour to a customer's requirements (as shown by the test of our invention) and the customer can follow a standard dough making procedure.

We have discovered that it is essential to the obtaining of reliable results that our method for the evaluation of a flour be carried out under fixed ambient conditions of temperature and humidity. If the ambient conditions are the same, the test results will be the same for a given flour. Thus, to achieve reliability, our method preferably is carried out in an enclosure in which the temperature and humidity of the air are closely controlled. A further factor will be the extent of air movement in relation to the dough. We have discovered that standardization of this is best obtained by providing a constant air movement in an upward direction about the bowl in which the mixing is carried out.

Additionally, further information, with respect to the flour, can be obtained which will be useful in the evaluation of the flour if continuous instantaneous measurements are made of the force required to work the dough in shear as previously mentioned. In other words, the instantaneous strength of the gluten throughout the working period is significant as well as the overall resistance of the gluten to fatigue. The rate of drop in the force required to work the dough following the point of maximum elasticity additionally can aid in evaluating the flour.

Our basic method is capable of being carried out in a number of prior art machines which will work the dough in a shear at a constant rate, specifically some of those discussed in the two books previously mentioned. However, with the prior art devices of which we are aware, it would be difficult, if not impossible, to ascertain an exact point at which the gluten fatigued or failed completely. We have devised a novel piece of apparatus utilizable for our complete method which, because of its construction, gives a positive indication of the significant data already discussed, either by a visual observation or by apparatus indication (written or visual). Elementally, this apparatus resembles the prior art apparatus, in that two means are provided, with one or both being movable with respect to the other to work the dough in shear or by pulling and stretching. Measurements are made of the force required to so work the dough at a constant rate. The important distinction between our device and prior art apparatus, is that provision is made for the dough to escape from the working means when the gluten fatigues. The dough is worked centrifugally at sufficient speed to result in its escape when the gluten fatigues. Up to the fatigue point the strength of the gluten will hold the dough in a position at which it is worked by the working means. However, when the gluten fatigues it no longer has the ability to hold the dough onto the working means, and the dough escapes from the working zone by centrifugal force. The point at which the gluten in the dough has failed completely is signified by the substantially complete escape of the dough from the working means. That significant changes occur in the dough at this fatigue point variously can be demonstrated. For example, up to fatigue the dough will sink in water while thereafter it is buoyant. The percentage of soluble versus insoluble gluten changes following fatigue by our process.

To carry out a test in accordance with our invention the dough must be worked in shear at a substantial rate of speed. The action must be at a rate at which it can be characterized as a whipping or beating as distinguished from a stirring. The thinner the dough (a factor hereinafter discussed) the greater should be the rate at which it is worked. Working at a whipping or beating rate results in the maximum development of the gluten as well as its fatigue in a reasonable test period. It enables one to pinpoint the occurrence of optimum dough development, maximum dough elasticity, and complete fatigue of the gluten.

Figure 1:
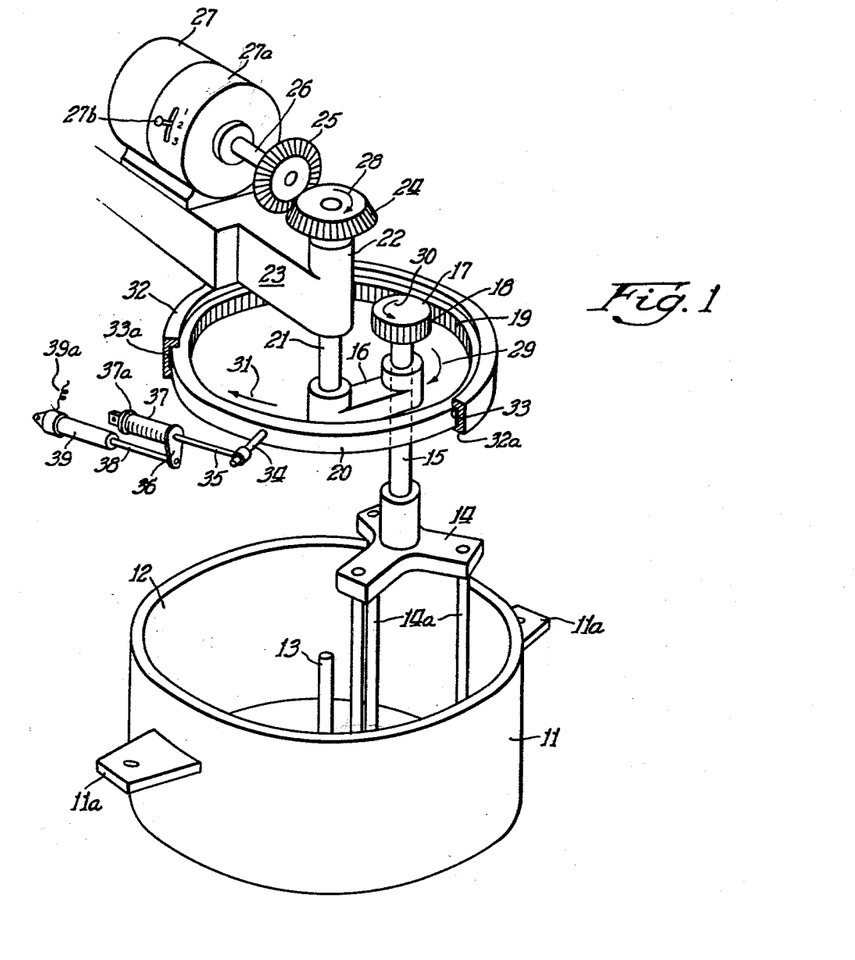
FIGURE 1 is a view, in perspective and somewhat schematic, of a testing means for carrying out the present invention.

Referring in detail to the illustrative apparatus embodiment shown in FIG. 1 of the drawing, the numeral 11 indicates a mixing bowl supported against rotation or accidental movement as by lugs 11a in any suitable manner which need not be here shown. The bowl 11 is preferably formed of cast aluminum or stainless steel and has a smooth, polished inside surface 12. The surface smoothness of the inside of the bowl must be standardized, as for example, from 6 to 8 R.M.S. We have found that this is most easily achieved on a stainless steel lining in an aluminum bowl. In the bowl 11 is a fixed upstanding center post 13 that cooperates with a tri-leg rotatable spider element or beater 14 that has the three uniformly arcuately spaced (120 degrees apart) depending mixing legs 14a that extend downwardly into the bowl 11 in the region about the center post 13. The legs 14a are spaced from and move about the center post 13.

For purpose of operation of mixing element 14 the latter is here shown rigid with a vertical spindle 15 that is rotatable in a horizontally extended sweep arm 16. Spindle 15 at its upper end above the arm 16 carries a spur gear 17 having the gear teeth 18 that mesh with gear teeth 19 in an internal ring gear 20 that is concentric with a shaft 21 that in turn is rigid with the arm 16 and that turns in a bearing 22 carried by a motor support 23 that overhangs the bowl 11. As seen in the drawings, shaft 21 is vertically aligned with center post 13 and at its upper end, and above the bearing 22, has fixed thereon a bevel gear 24 that meshes with another bevel gear 25 fixed on the output shaft 26 of a combined electric motor and speed changer. The latter includes the motor proper 27 and a speed changer unit 27a from which the output shaft 26 is driven. Hand lever 27b is indicated for manual control or selection of one of three speeds available, namely, say, a first or relatively low speed, a second or intermediate relatively higher speed, and a third or high speed. It will be understood that the arrangement just described exemplifies any suitable drive and speed changer mechanism for the mixing element. The motor support 23 may be suitably mounted on a common supporting structure for the motor and for the bowl 11, if desired, and which need not be here described.

Operation of the motor 27 to rotate the bevel gear 24 in the direction of the arrow 28 revolves or sweeps the arm 16 in the same direction, that is, in a direction of arrow 29. Arm 16 carries with it the spindle 15 and spur gear 17 around the inner periphery of the internal ring gear 20. At the same time, since the spur gear 17 and internal gear 20 have inter-meshing teeth, the spindle 15 will also rotate on its own axis while the assembly of the spindle 15 and beater 14 revolve as a whole about the axis of the shaft 21, in a well-known planetary motion. In such motion, the spur gear 17 will normally rotate on the axis of the shaft 15 in the direction of the arrow 30 or opposite to the direction of the arrow 29.

In accordance with the present invention, ring gear 20 is mounted for limited rotational movement or revolution, about the axis of the shaft 21, in the direction of arrow 31 (which is the same direction as arrow 29) in a bearing or collar 32 which is also suitably fixedly supported by the motor mounting 23, as need not be further described. Bearing 32 is stationary with respect to the mounting while the ring gear is permitted to have limited rotation in the bearing by sliding around the inner surface thereof in the channel 33 in this inner surface. Channel 33 is desirably lined as indicated at 33a with a facing of a polytetrafluoroethylene polymer material such as manufactured and sold by E. I. du Pont de Nemours & Co. under the trademark "Teflon." This material is characterized by some inherent lubricity with chemical inertness over a wide range of temperatures, thus providing a suitable bearing element for the ring gear.

Figure 2:
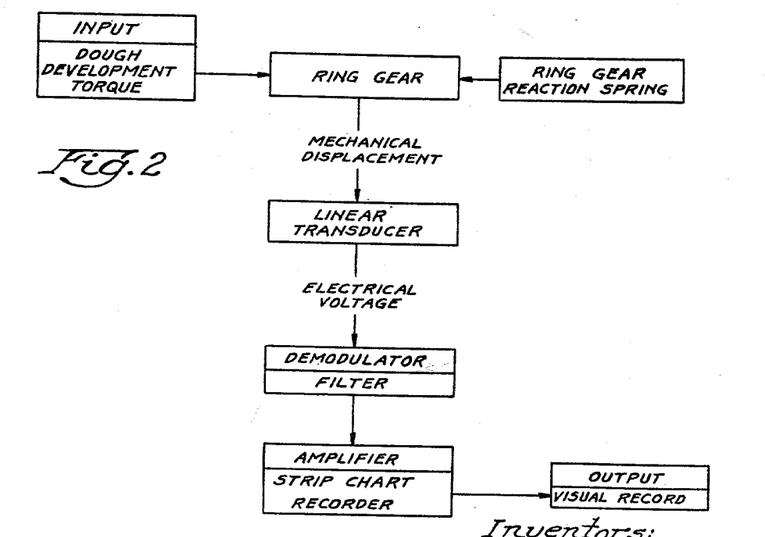
FIGURE 2 is a block diagram showing the mechanical and electrical components employed with the apparatus.

Bearing 32 has any suitable opening in its perimeter such as 32a (here exaggerated for descriptive purposes) to allow passage outwardly thereof and vibratory movement therein of radially projecting stud pin 34 which is rigid with the ring gear 20. Stud pin 34 is also rigid with a push-pull rod 35 that rigidly carries a lug 36 which is suitably supported to be in constant contact with one end of a compression coil spring 37 the other end of which is fixedly supported as at 37a on any suitable supporting structure which may be the same as or different from the supporting structure for the bowl 11 and motor 27. Mounting 37a serves as a fixed abutment for spring 37 in the compressive action thereon of lug 36. Coil spring 37 is placed under compression by movement of ring gear 20 in the direction of arrow 31. Compression of this coil spring therefore resists the movement of ring gear 20 and provides a resilient torque reaction member for the ring gear. The action of the stud pin 34 is transmitted also through lug 36 to an armature rod 38 that enters the cylinder 39 that is also suitably fixedly mounted with respect to bearing 32. The device 38–39 is representative of any suitable electrical transducer device. Such device, either in the form of a variable linear differential transformer or of a linear potentiometer, converts the movement of the ring gear 20 into a proportional electrical output, which output, in the form of an electrical voltage, is led off by cable 39a and suitably demodulated and filtered and then amplified, and recorded on a strip chart recorder for a visual record of the rheological properties of the dough sample, as indicated in block diagram in FIG. 2 and as later further described with reference to the graphs of FIGS. 3, 4 and 5. It will be seen that the charts have transverse gradations from 0 to 100 thereon designated in units of ten, and linear subdivisions thereof in designated time increments of two minutes.

In practicing the invention, a suitable relatively small predetermined quantity of the flour to be tested is first placed in the bowl 11 and then sufficient water, preferably distilled water at about 90° F., is added to produce, when mixed with the flour, first a homogeneous plastic mass and then a given consistency therefor as later more particularly described. The temperature of the starting mixture like other conditions should be standardized. In some instances other factors will dictate that standardization can most easily be achieved by using a water temperature of 70° F. The mixing legs 14a, driven as previously described, normally not only rotate on the axis of the spider element 14 but also revolve about the axis of the center post 13, intercalated successively with the latter, and cooperate with the center post to pull, stretch and twist the dough for the purpose of initially homogenizing the mix and then of testing its tolerance to mixing action and evaluating such other factors as water-absorption, dough-elasticity, and gluten life. As the mixture of flour and water changes from a loose heterogeneous mass to a homogeneous semi-plastic or plastic state and the consistency of the dough increases, resistance to the rotation of the shaft 15 on its own axis increases. Spindle 15 will manifest this resistance to rotation as a torque reaction on ring gear 20, this reaction torque being transmitted from the spindle 15 through gear 17 and teeth 18 to gear 20. Said reaction tends to cause ring gear 20 to rotate in the direction of arrow 31. The action of the compression spring 37 on the stud pin 34, and consequently of armature rod 38, exactly balances the torque produced in spindle 15 by the rheological development of the dough mass. This fluctuating mechanical movement is changed to electrical voltage and recorded as here described.

In each test the same amount of flour is placed in the bowl 11, the amount being relatively small with respect to the size of the bowl so that when brought to a plastic mass, with the added water, it will just fill the area defined by the mixer legs 14a and the bowl center post 13 and to about the height of the post. In order to describe the critical points shown in the graphs, namely, A, B and C, and particularly point C, it has presently been found desirable to limit the dough mass (flour and water) to a quantity of approximately 700 grams of flour which has been found to be a desirable amount for a bowl size of eight liters. The relationship of the dough mass to the bowl size is important in that as the dough changes rheologically during the course of mixing, portions of it leave the mass and adhere first to the bottom surface of the bowl and later to the side surface of the bowl, thus changing the torque proportionately occurring in the dough between the movable legs and the fixed center post. Room is desirably here shown provided for this escape of the dough from the mixing legs. It first begins at the point B on the chart at which time dough begins to scale off from the mass and adhere to the bottom of the bowl. The space 43 between the mixing legs and the bottom surface of the bowl allows room for this. At point C where ultimate mixing capacity is recorded and complete fatigue occurs, the dough will have left the mixing legs substantially entirely and be adhered to the bottom and side of the bowl. The space 44 between the spider legs 14a and the wall of the bowl 11 allows room for the dough to go from the mixer legs during the last stages of dough development, or the first stages of dough breakdown, at which latter time the dough becomes a stringy, sticky, non-plastic mass, so that when ultimate dough mixing capacity has been reached, the mixing legs are substantially free of dough.

The space provided between the walls (i.e. sides and bottom) of bowl 11 and the moving spider legs 14a should not be significantly larger than that necessary to accommodate the quantity of dough employed after gluten has fatigued. The reason for this is that, by reason of the rapid centrifugal working employed, some portions of the dough may escape before the gluten in those portions has fatigued. Using a space about the moving spider legs of the size designated there will be a moving mass of dough within the bowl continually slapping at the sides of the bowl. To the extent any dough has been deposited on the walls before the gluten therein is fatigued the moving mass of dough will pick it up and return it to the moving mass. It is significant however, that when dough is deposited on the wall after the gluten therein has fatigued, that deposited dough will not be picked up by the moving mass.

The transverse division marks 0 to 100 on the charts may be arbitrary to indicate merely relative rheological properties of the mix. Since the line 50 on the chart is the center or mid-point of the chart having 0 to 100 lines, the line 50 is conveniently taken to work to or "band on". The percentage of water added on the basis of flour used is that necessary to bring the dough consistency to the transverse 50 line on the chart at the point B. With some recording instruments the fluctuation in torque during the process will be more fully displayed if the banding, i.e. standardization of consistency, is made at another point on the graph. Thus, in some instances we deem it preferable to band on 70 for example. In any event the banding is merely establishing a standardized reference for consistency of the dough. As a matter of fact in some applications we have found that it is desirable to use point A on the curve as the "banding point"; that is, all such tests are run with a dough of a consistency such that point A always will fall on a given line on the chart.

With respect to the amount of water to be added to the 700 grams of flour for the test, this may be determined by previous experience with a given flour, as to its water absorption capacity, or, if that is not already known, by making a preliminary test or tests to determine its water absorption capacity to ascertain what percent of water ("as is" absorption) should be added to the 700 grams of flour to produce a consistency curve that will band on the line 50 of the chart. This is determination of the amount of water to be added in common practice in cereal chemistry and will be understood by those skilled in the art.

Insufficient water will result in a curve that is too high (with respect to the line 50) and, inversely, too much water will result in a curve that is too low (with respect to the line 50). In the first instance the consistency is too stiff and in the second it is too thin.

The percentage of water is initially determined on an "as is" basis, being later mathematically converted to a 14% moisture basis for all flours to get a true comparison of relative water absorption capacities of the various flours themselves, disregarding the actual initial moisture content of the flour. Such calculation may be made by use of the following equation:

$$a_{14} = a + m\left(\frac{100-14}{100-m}\right) - 14$$

in which $a_{14}$ is the calculated absorption at 14% moisture content; $a$ is the "as is" absorption (actual percent of water added to sample); and $m$ is the actual initial moisture content of the flour.

The charts move from left to right or in the direction of the arrow 40 during the operation of the mixer and the recording pen moves transversely thereon under the influence of the change in voltage charge from the transducer. Time factors are shown in the linear indicia on the charts, in increments of two minutes and fractions thereof. In this instance, in graph of FIG. 3, for example, the recorder began its movement at 41 or zero time at which time the flour and water mixture had almost negligible viscosity. As the viscosity increased by the formation of gluten strands in the dough, the curve rose on the graph and the resulting record shows a substantially increased fluctuating viscosity in the dough. This information is referred to as the rheological properties of the dough material. In each case, optimum dough development is recorded at A, being the time (after zero) when this is reached. A visual examination of bowl 11 during the mixing process will reveal that point A is the time at which the bowl walls become clean while the dough is an entity entangled about the posts 13 and 14a. Maximum dough elasticity is shown at time B. In listening to the apparatus work, the sound will reveal that the maximum energy is being expended as compared to any other time during the test. Following this peak, the viscosity drops slightly but is still fairly constant until the point C at which time the dough broke down and the viscosity dropped suddenly to an almost negligible point, as at 42, or end of test. This can be observed visually since at this time all of the dough (for practical purposes) will have moved to the walls of the bowl 11, and none will be intertwined between post 13 and legs 14a.

Since, for testing purposes, all of the flour-water doughs tested are brought to the transverse 50 line of the chart at point B by adding the necessary amount of water for that purpose, the consistency at point B will be the same for all flours tested. The average mechanical mixing energy input (at point B) will then be the same for all of the flour-water doughs and points A, B and C are then directly comparable from flour to flour. Manifestly, variations in the times at which points A, B and C occur are affected by the characteristics of the individual flours. By means of the present invention, the baker is enabled to determine these flour variations and anticipate the process adjustments needed to accommodate them.

Figure 3:
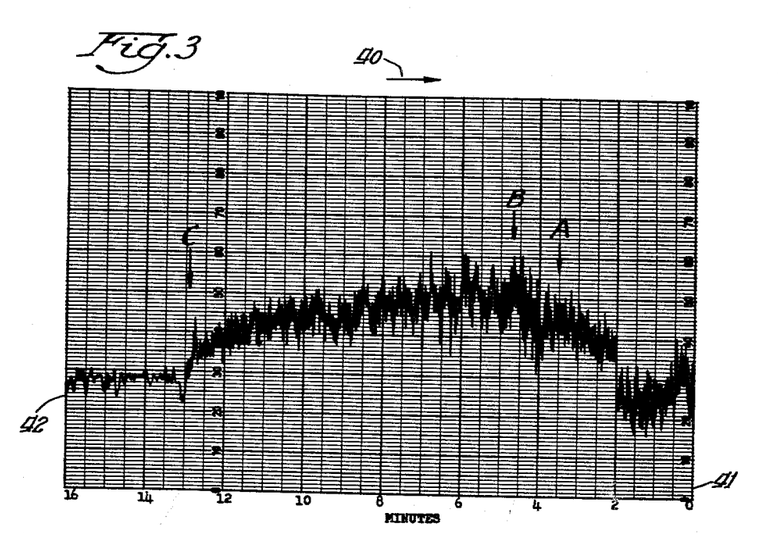
FIGURE 3 is a chart showing a graph expressing the rheological characteristics of one sample of flour.
Figure 4:
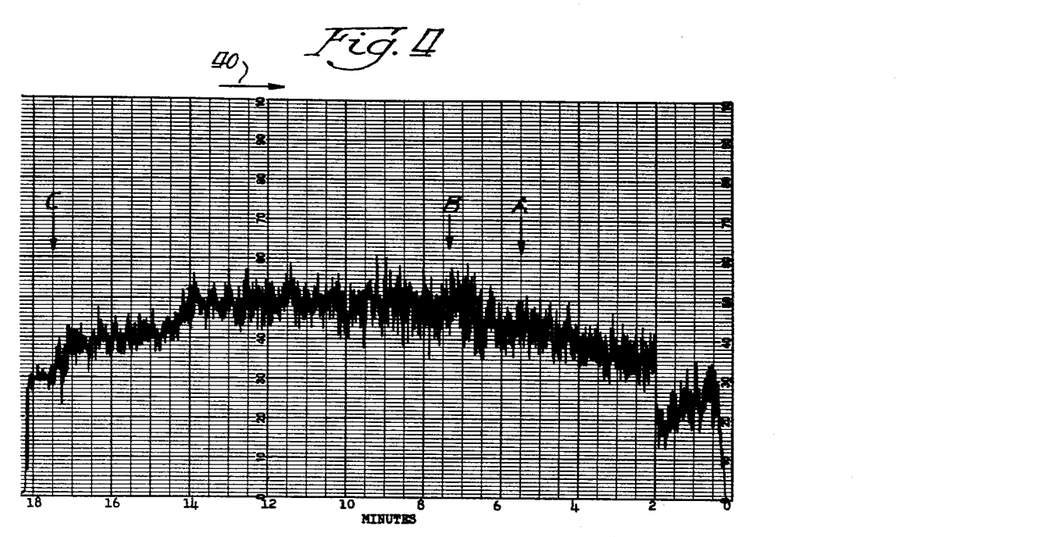
FIGURE 4 shows another graph for a different flour.
Figure 5:
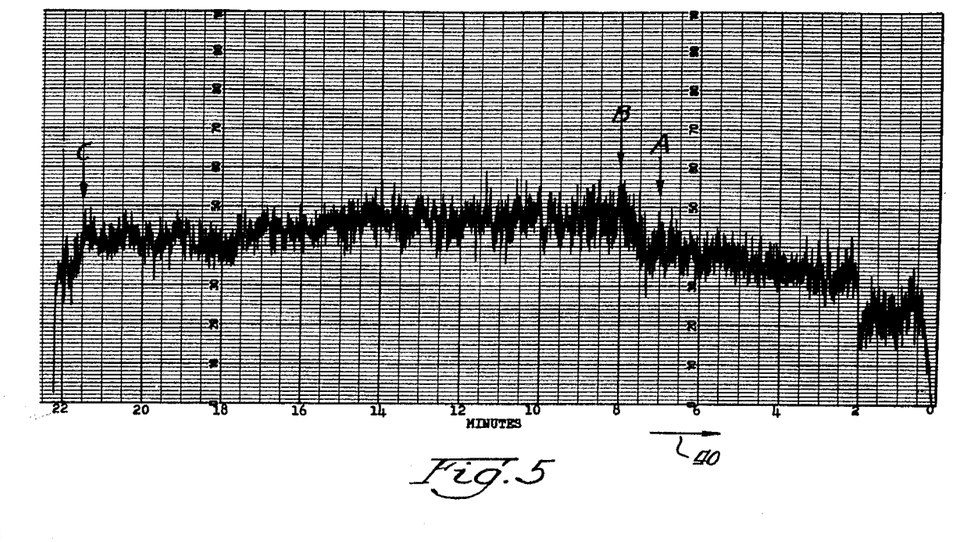
FIGURE 5 is a graph for a still different flour.

Illustrative variations are disclosed in the graphs of FIGS. 3, 4 and 5 showing tests of three "Bakers Patent" flours, the result of which are tabulated next below, together with the water absorption percentages:

| Flours | Water Absorption, Percent, 14% Moisture Basis | Time in Minutes | | |
|---|---|---|---|---|
| | | A | B | C |
| Fig. 3 | 68.0 | 3½ | 4¾ | 12¾ |
| Fig. 4 | 66.3 | 5½ | 7¼ | 17½ |
| Fig. 5 | 63.5 | 7 | 8 | 21½ |

Thus, the flours of FIGS. 3, 4 and 5, determined by their respective graphs obtained by means of the present invention, are seen to have different water absorption and different rheological characteristics. It will be noted that in each instance the mixer was run for a period of two minutes at slow speed to accomplish the initial mixing of the flour and water to form the dough. At the end of two minutes the mixer was speeded up as signified by the abrupt rise in the graph. Two minutes was chosen arbitrarily for standardization purposes. It can be varied but what other time period is chosen should be used consistently from test to test to provide comparable results between the various flour tests.

Discussing the information obtainable from the graphs of FIGS. 3, 4 and 5:

FIG. 3 shows a graph of the rheological properties of a water and flour mix using a flour from a certain geographical section of the country. With the flour of FIG. 3, approximately 1.7% more water was used than with that of FIG. 4 and 4.5% more water than with that of FIG. 5, to band each on the line 50 to produce the same consistency at point B. Beginning with zero time and reading to the left on the graph, a period of two minutes was consumed in establishing a plastic condition for the mix. During this time, the mixer was set to run at the first or relatively low speed. After two minutes, elasticity was found to be established. At the end of two minutes the speed was increased to the second or relatively higher speed. Point A on the graph indicates the time at which optimum dough development was reached; point B indicates the time at which maximum dough elasticity was reached; and point C indicates the time at which ultimate dough mixing capacity, or point of complete fatigue, occurred. The flour of FIG. 3 took 3½ minutes to reach point A; 4¾ minutes to reach point B; and 12¾ minutes to reach point C. Flour of FIG. 3 is thus shown to be a weaker flour having less tolerance to mixing than that of FIG. 4 and that of FIG. 5, but having a higher water absorbing capacity.

FIG. 4 shows a graph depicting the rheological characteristics of a flour and water mix using flour from a different geographical area. Point A occurred in 5½ minutes, point B in 7¼ minutes, and point C in 17½ minutes. The flour of FIG. 4 is thus shown to be a stronger flour than that of FIG. 3 but not as strong as that of FIG. 5. FIG. 4 flour had less water absorption capacity than FIG. 3 flour but more than FIG. 5 flour.

FIG. 5 shows a graph of the rheological characteristics of a flour and water mix using a flour from the same geographical area as FIG. 4, but from a different flour mill. Here point A was reached in 7 minutes; point B was reached in 8 minutes; and point C in 21½ minutes. It is to be noted that the mix of FIG. 5 took about a minute and one-half longer to reach optimum dough development (point A) than that of FIG. 4 thereby indicating a stronger flour than that of FIG. 4. The mix of FIG. 5 took three-quarters of a minute longer to reach point B than that of FIG. 4 and four minutes longer to reach point C, and even longer intervals as compared with the flour of FIG. 3, again indicating a stronger flour. FIG. 5 while showing a stronger flour from a baking standpoint required less water in the mix to band it on the 50 transverse gradation at point B, namely, 63.5 percent as against 68 percent for the flour of FIG. 3. The comparison indicates that the flour of FIG. 5 while the stronger flour of the three had less water absorbing capacity than that of FIG. 3 or FIG. 4 being 63.5% as compared with 66.3% for that of FIG. 4 and 68% for that of FIG. 3.

Figures 6, 7:
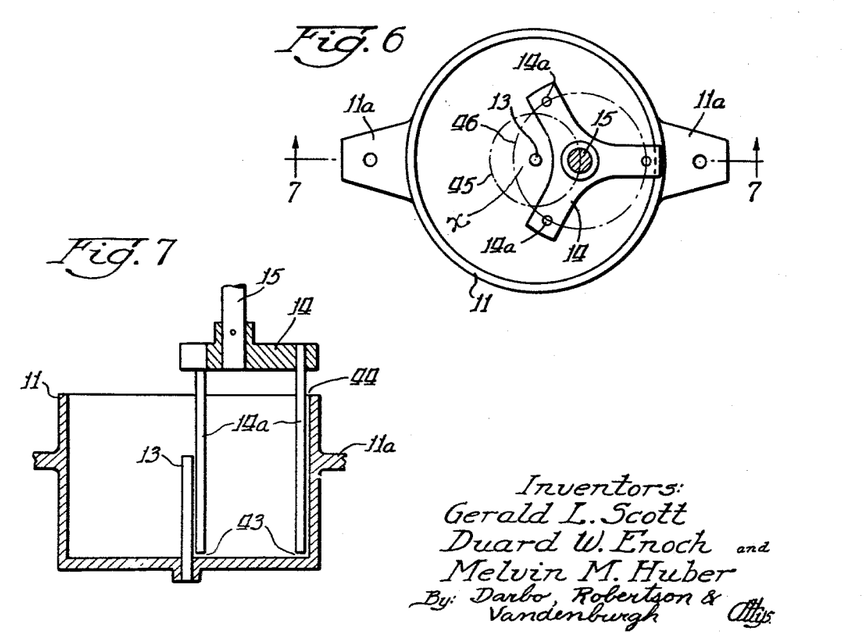
FIGURE 6 is a somewhat reduced plan view of the bowl shown in FIGURE 1.
FIGURE 7 is a section taken on the line 7—7 of FIG. 6.

Referring to FIGURES 6 and 7, preferred dimensions for the mixing bowl and mixer legs as here shown are next given:

Bowl inside diameter—9.875 inches
Bowl inside height—6.5625 inches
Diameter of center pin 13—.500 inch
Diameter of each leg 14a—.500 inch
Distance between lower ends of mixer legs 14a and between bottom surface of bowl (as at 43, FIG. 7)—0.210 inch
Shortest distance between orbit of legs 14a and inner surface of bowl (as at 44 FIG. 7)—0.105 inch
Diameter of the orbit (45) (center to center) of spindle 15—3.666 inches
Diameter of orbit (46) (center to center) of legs 14a about spindle 15—5.500 inches
Height of center post 13 above bottom surface of bowl—4.250 inches
Length of mixer legs 14a below spider element 14—7.375 inches
Shortest distance (X, FIG. 6) between orbit of mixer legs 14a and center pin 13—0.417 inch It will be noted from FIG. 6 that the orbit 46 of legs 14a includes the center post 13 at all times, the spider 14 being sufficiently large for this purpose.

The speed of rotation of spindle 15 about its axis 21 is desirably as follows for the various speeds of the machine; first or low speed 46 r.p.m.; second or intermediate speed 86 r.p.m.; and third or high speed 156 r.p.m. The rotation of the spider 14 about its axis 15 is preferably as follows: first or low speed 107 r.p.m.; second or intermediate speed 198 r.p.m.; and third or high speed 361 r.p.m. It will be thus noted that the speed of rotation of spider 14 on its axis 15 is about two and one-third times faster than that of spindle 15 on its axis 21. In view of the fact that this ratio is approximately two and one-third to one, the result is what may be termed a "precessed" action in that each rotation of spider 14 about its axis 15 and of 15 about its axis 21 causes each leg 14a to be at its nearest point to the inside of the bowl (as at 44, FIG. 7) at a different point on the bowl on each revolution of the spindle 15. The motor 27 itself desirably has a fixed speed of 1725 r.p.m.

The knowledge which the baker may derive from graphs such as those of FIGS. 3, 4 and 5 enables him to determine the proper mixing time for dough. A comparison of these charts indicates to the baker that he has less mixing time tolerance with the flour of FIG. 3 than with that of FIG. 4 or FIG. 5, and the greatest mixing time tolerance with that of FIG. 5. Such comparison also enables the baker to determine the relative water absorbing properties of the three flours. He will know that he can add the greatest amount of water to the flour of FIG. 3 and the least to that of FIG. 5.

The apparatus and method may be similarly used for the testing of other flours such as "clear," whole wheat and cake flours. "Clear" flour is generally a stronger flour than "bakers' patent" and would be so indicated by an extended time to reach points A, B and C. Whole wheat flour test would be mixed at first or low speed, due to the presence of bran. Cake flour also can be run at a low speed. Whole wheat and cake flours offer less resistance to mixing.

Other beneficial information can be ascertained with the present invention, such as the effect of adding ingredients to the flour-water mix, such as shortening, powdered milk, solids, salt and sugar. When it is desired to test the effect of the addition of a specific ingredient to a given flour, a flour-water graph is first run as hereinbefore described. Then, another graph is made using the same amount of flour and the same amount of water, plus the desired percentage of ingredient. Changes in the locations of points A, B and C on this second graph as compared with the locations of the points on the flour-and-water graph will indicate the effect of the addition of the ingredient on the rheological characteristics of the mix. With ingredient added the mixer would run at the intermediate speed. For testing samples of finished, i.e., fully developed dough, the mixer may be run at the first or low speed for about two minutes and then at the highest or third speed for the remainder of the test. In this case, the finished dough sample should preferably weigh about 1200 grams.

In testing finished doughs, where the determined amount of water has already been added, the moisture absorption capacity would not be ascertained hereunder, but the other information would be learned.

The desirable flour for making cakes is quite different from that which is used in making bread for example. One of the principal distinctions between the flours for these two purposes is that the cake flour has a relatively low gluten content, and/or the gluten is relatively weak. The tests illustrated and described, in connection with FIGURES 3, 4 and 5 are primarily concerned with flours having a relatively high/strong gluten content. If the identical test procedures are followed in testing a relatively low/weak gluten, a graph will be obtained which is so "fore-shortened" that it is quite difficult to interpret. The gluten will fail so quickly that significant reading of the test results becomes substantially an impossibility. As a consequence, slight variations are employed to obtain graphs more clearly illustrating the comparative characteristics of the various cake flours.

One alternative, already mentioned, is to run the tests on cake flour at the lowest of the three speeds throughout the tests. The result of this is that the gluten will fail more slowly over the test period. A longer time will be required for the gluten to fatigue, giving the more extended readable graph. However, this procedure is not as satisfactory as the second alternative, inasmuch as it does not as clearly pinpoint the significant points in the graph already discussed. To emphasize the rheological changes in the dough we prefer the second alternative procedure.

As a preface to discussing the second alternative procedure for the testing of cake flours, we might point out that the tests on bread flours are run at about 65% absorption, the exact absorption figure depending upon the particular flour involved. Thus, for example, the test of FIGURE 3 was run at 68% absorption, FIGURE 4 at 66.3%, and FIGURE 5 at 63.5% (all on a 14% moisture basis). In the second alternative procedure for the testing of cake flours, the test is run at about 115% absorption. That is, in these tests approximately equal parts by weight of flour and water are employed. This results in what might be described as a "soupy" mix. The test then is run at the highest of the three speeds with the soupy mix of the type described. It would be expected that no significant changes would occur during the mixing process because of the soupy character of the mix. Surprisingly enough, however, graphs are obtained which are not greatly unlike those of FIGURES 3, 4 and 5. Of course, these graphs so run cannot be compared with the results of the tests on bread flour as heretofore described, but must be compared with tests on other flours run on the approximately 115% absorption basis. In other words, as heretofore emphasized, standardization of test procedures is requisite to the obtaining of significant comparative results.

A very marked improvement in obtaining a distinctive display of the significant characteristics of flours for cake manufacture is obtained by incorporating about 2% salt in the dough. Salt in roughly this proportion delays the hydration of the flour and emphasizes the characteristics of a flour as demonstrated on the graphs. A curve will be obtained having an initial portion clearly illustrating the ability of the flour to hydrate. Since cake batters incorporate salt the graph will properly represent the action of the flour as it is actually used.

The procedure for carrying out tests on a 115% absorption basis is substantially the same as that previously described. The significant difference being that the high third speed is employed in running the test and a fixed percentage of water is used for all tests. To a given amount of flour, predetermined amounts of salt and water are added. After wetting all of the flour with the water, i.e. premixing, the mixer is turned up to its highest speed. In this instance the premix time may be standardized at one-half minute, as distinguished from the two minute premix time when testing bread flours.

While it might be expected that at this high speed, with a soupy mix, the spider would throw the flour and water out of the bowl, surprisingly enough, this does not occur. The initial portion of the curve is generally low and its height, shape and length illustrates the ability of the flour to hydrate. After some hydration, a dough ball will form. As the dough ball is worked, there is a development of the gluten to a point of maximum elasticity, and thereafter the gluten commences to fail. The complete failure of the gluten is signified by dough moving out of the mixing zone, i.e. the volume described by the moving spider. All of these changes are identifiable on the graph produced by the strip chart recorder. By comparing the results with the results of comparable tests carried out on other cake flours, the most suitable cake flours are selected and/or blended. The 115% absorption test reveals the hydration ability and the thickening power of the flour, which are significant characteristics to the baker. Recorded results of fatigue time are displayed which will permit significant comparison between various flours.

By using a three leg agitator or mixing element, the uniformity of dough mix has been found to be improved. A three leg agitator has also been observed to produce a more uniform readable record with less mechanical noise than with a two leg agitator.

A loading spring such as 37 with a spring rate of about 165 pounds per inch has been found to give desirable results. This spring rate permits a total linear displacement, or rod 38 movement, of about five-sixteenth of an inch. This may be varied depending upon the characteristics of the transducer 39 used. A chart speed of about one-half inch per minute has been found to give a rather readable record. This is also subject to variations depending upon the transducer type, amplifier gain, and electrical damping used.

A suitable transducer is an Atcotran Model #6206-M-12-MS Variable Linear Differential Transformer.

A suitable demodulator is an Atcotran type #6106-DR.

A suitable filter is an R-C Network, an 8 mfd. capacitor in parallel with a 39K ohm resistor.

A suitable amplifier and strip chart recorder is a Varian Model G11A.

Electrical wiring for the electro-mechanical transducer and chart recording system above described and shown (FIG. 2) may be conventional and well known to those skilled in the art and need not be further described. Some of the electrical elements that might be employed, e.g. amplifier, strip chart recorder, etc., are more sensitive than others and may more fully display the rheological changes in the flour. This along with other factors, e.g. cost, will be evaluated in selecting the particular components employed.

Figure 8:
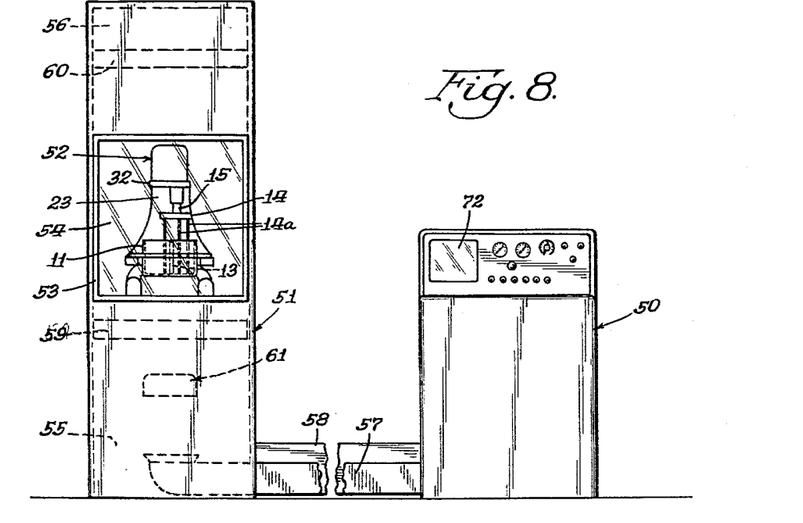
FIGURE 8 is an elevation of an embodiment in an environmental enclosure.

FIGURE 8 illustrates an embodiment of our invention including environmental control apparatus. There is a conditioning equipment cabinet generally 50, and a mixer cabinet generally 51. Within mixer cabinet 51 is a mixer chamber 54 in which a mixer generally 52 is positioned. The details of the structure of mixer 52 already have been described in connection with FIGURES 1, 6 and 7. A door 53 is provided at the front of the mixer chamber 54 to permit access to mixer 52.

Below the mixer chamber 54 is an intake plenum 55 and above a discharge plenum 56. Plenum 55 communicates with an intake conduit 57. Plenum 56 communicates with the discharge conduit 58. Within cabinet 51 the only communication between plenums 55 and 56 is through the chamber 54 within which the mixer 52 is located. Between plenum 55 and the mixer chamber is a filter 59. A filter 60 is positioned between the mixer chamber and plenum 56. Temperature and humidity sensing instruments generally 61 are located in plenum 55.

A suitable blower (not illustrated in FIGURE 8) circulates the air through conduit 57 into plenum 55 with the air then passing upwardly through filter 59. Plenum 55 should be sufficiently large so that there will be an even flow of air upward through filter 59 in all parts of the chamber 54 about mixer 52. After passing through the mixer chamber, the air traverses filter 60 and enters plenum 56. From plenum 56 the air is circulated back through conduit 58 into equipment cabinet 50. Within equipment cabinet 50 are the suitable air conditioning devices (not illustrated in FIGURE 8) to maintain the air that is returned to the mixer cabinet through conduit 57 at a constant temperature and humidity.

Figure 9:
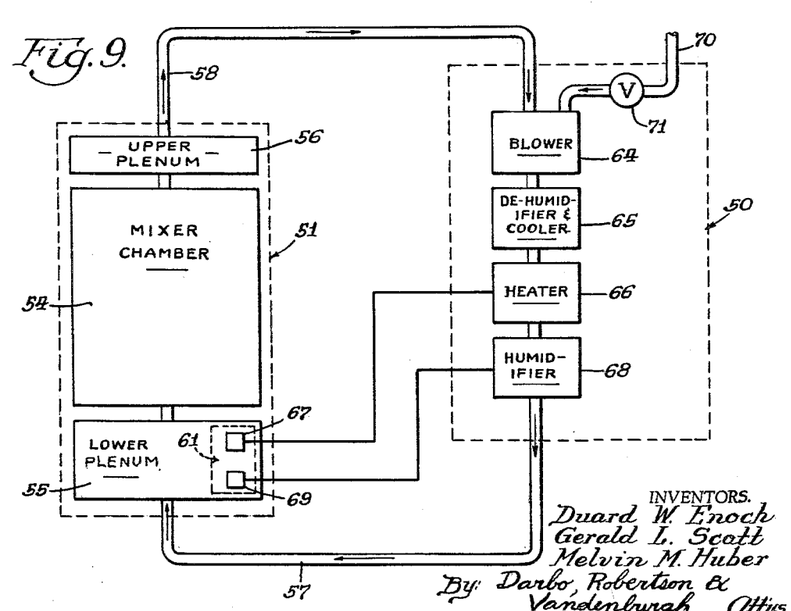
FIGURE 9 is a schematic diagram of the environmental control apparatus.

FIGURE 9 diagrammatically illustrates the air conditioning equipment contained in the equipment cabinet 50 and its connection to the mixer cabinet structure 51. The air is drawn from upper plenum 56 through conduit 58 by a blower 64. From blower 64 the air is delivered to a dehumidifier and cooler 65. Dehumidifier 65, which may be an ordinary refrigeration type unit, reduces the humidity and temperature of the air below that desired for the air in mixer chamber 54.

The air is then reheated in a heater 66 to the desired temperature. Heater 66 is controlled by a thermostat 67 located in the lower air plenum 55. Heater 66 may be a suitable resistance type electric heater.

From heater 66 the air goes to a humidifier 68 controlled by a humidity sensing element 69, likewise located in plenum 55. Humidifier 68 may be a steam generator which adds sufficient steam to the air passing through the humidifier to bring the moisture content of the air up to the desired standard. From humidifier 68 the air is returned to the lower plenum 55 through conduit 57.

In some tests the user may desire to add fresh, makeup, air in addition to recirculating the air through the test chamber 54. To permit this to be done an outside air intake 70 is provided on the low pressure side of blower 64. A manual valve 71 permits the user to control the amount of fresh, make-up air that is added to the air being recirculated through chamber 54. This intake line and valve also could be employed to enable the user to carry out tests in atmospheres of other gases, e.g. nitrogen, carbon dioxide, etc.

With reasonable limits the exact degree of humidity, temperature, and rate of air flow are not critical. The important factor is that they be standardized for all tests.

A relatively low rate of air flow, e.g. 50–60 ft. per min. may be employed. A temperature standardization of 70° F. may be selected. The humidity standard may be selected as 50 percent, for example. It is important that the air movement be as uniform as possible with substantially no eddys. The filters 59 and 60 are employed in this regard.

The process we have devised for controlling the test conditions is exceptionally effective. We have discovered that a much more accurate control can be maintained over a moving body of air such as we use, and is exceptionally more effective than prior efforts to condition a stagnant body of air in a closed, sealed, chamber. Another feature is that a much more accurate control over humidity can be achieved by first dehumidifying the air below the desired level, and then rehumidifying it up to the desired level by the addition of moisture in the form of steam. To a lesser extent the same is true of temperature control. By first cooling the air and then reheating it we are able to obtain an extreme accuracy with relatively simple equipment. These procedures also result in less lag and "hunting" in the operation of the sensing device, e.g. humidity sensing element 69, with respect to the operation of the air conditioning element, e.g. humidifier 68.

In the embodiment illustrated in FIGURE 8, the equipment cabinet 50 provides a control console. To this end the strip chart recorder 72 is mounted on a front panel thereof along with various control switches, visual temperature and humidity indicators, etc.

So arranged and practiced, method and means are disclosed for mixing a dough sample to advantageously determine its ultimate mixing capacity together with intermediate points of optimum development of the dough and its maximum elasticity.

An illustrative specification having been given according to the statutes, from the foregoing workers skilled in the art will be able to practice the inventions hereof and to avail of the benefits and advantages of the present disclosure. Such changes may be made including modifications or additions, as fall within the scope of the appended claims, without departing from the invention.

We claim:

1. The method of measuring the characteristics of a flour comprising the steps of: preparing a dough from said flour; working said dough at a constant rate by pulling and stretching until the gluten fails completely; and measuring the length of time required to (a) reach the point of optimum dough development, (b) reach the point of maximum dough elasticity, and (c) reach the point of complete fatigue of the gluten.

2. The method of claim 1, wherein the working of the dough is carried out under predetermined ambient conditions.

3. The method of claim 1, wherein a continuous measurement is made of the force required to work the dough.

4. The method of measuring the characteristics of a flour comprising the steps of: preparing a dough from said flour; centrifugally working said dough at a constant rate of pulling and stretching until the gluten fails completely; and measuring the changes in the force required to work the dough.

5. The method of claim 4, wherein continuous measurements are made and a written record is made of said measurements.

6. The method of claim 5, wherein the time elapsed is measured and set forth in said written record.

7. The method of claim 4, wherein the dough is in an air atmosphere while being worked an the temperature and humidity of the air in which the dough is worked are maintained constant.

8. The method of claim 7, wherein the dough is worked in an enclosure, air is continuously expelled from said enclosure; and air having a predetermined temperature and humidity is continuously supplied to said enclosure at a predetermined rate and from a predetermined direction with respect to the dough being worked.

9. In the method of measuring the characteristics of a flour by preparing a dough of said flour and working said dough in a given zone, the improvement comprising: determining the fatigue point of the dough by providing a space about the dough being worked which is sufficiently large in relation to the amount of the dough to enable substantially all the dough to escape upon fatigue while confining the dough within the working zone prior to fatigue, and centrifugally working the dough at a constant rate of pulling and stretching until all the dough has escaped from the working zone.

10. The method of testing wheat flour, which method comprises introducing into a mixing bowl, having a center post and a mixing element within the bowl and having a plurality of legs arranged to rotate in said bowl about and intercalated with said post in spaced relation to the bottom and side surfaces of said bowl, a test sample of flour and water in such proportions and amount as to produce a dough mass not substantially greater in volume than the clearance space between the legs of the mixing element and the bottom and side walls of the mixing bowl of the apparatus, mixing the test sample and continuing the mixing action to the point of optimum dough development, further continuing the mixing action to the point of maximum elasticity of the dough, further continuing the mixing action to the point of dough breakdown whereat substantially all of the dough of the test sample is located in the clearance space between the legs of the mixing element and the inside surfaces of the mixing bowl, and recording data representing the instantaneous force required for mixing the test sample throughout the mixing operation.

11. The method of testing wheat flours for comparison of the bakery product-making properties thereof which method comprises preparing for comparison charts showing respectively the rheological properties of at least two flour and water dough samples of different flours, each said chart being prepared by continuously mixing a standard sample of dough containing a particular flour to be tested while continuously measuring and recording the rheological properties of said dough sample with respect to time, and continuing the mixing and measuring and recording until the gluten structure of the dough is broken down.

12. The method of claim 11 wherein the amount of water mixed with the standard amount of flour for each dough sample is that which produces the same level of maximum rheological strength of each sample on the chart.

13. The method of testing wheat flour, comprising, mixing a flour and water sample in such proportions as to produce a dough mass, continuing the mixing action to the point of optimum dough development, further continuing the mixing action to the point of maximum elasticity of the dough, further continuing the mixing action to the point of dough breakdown, and recording the time intervals for arriving at each said point respectively.

14. The method of claim 13 including determining the amount of water absorbed by the dough to produce a predetermined range of viscosity during said mixing action at the level of maximum elasticity.

15. The method of testing wheat flours which method is characterized by mixing a water and flour dough mass for each flour tested until the gluten structure of the dough is broken down and determining the time interval for arriving at said breakdown point for each flour, whereby to arrive at comparable dough life data for various flours.

16. In the method of controlling the ambient air conditions in a test chamber wherein air is continuously expelled from the chamber and air having a predetermined temperature and humidity is continuously supplied to said chamber, the improvement comprising: at least a portion of the supplied air being made up of the expelled air, said supplied air first being cooled to a temperature below said predetermined temperature and the moisture content thereof being reduced below that required to provide said humidity at said predetermined temperature, the cooled air then being reheated to said temperature, said reheated air being supplied with sufficient moisture in the form of steam to raise the humidity of said reheated air to said predetermined humidity, and thereafter said reheated and rehumidified air is supplied to said chamber.

17. A testing apparatus comprising: a mixing bowl having a vertical center post therein; mixing means extending downwardly into said bowl and including three vertical legs spaced equal distances from each other, and power means to rotate said legs at a constant speed about said center post and simultaneously about an axis parallel to said center post, equidistant between said legs, and closer to said center post than is the distance between said legs and said axis; and recording means connected to said mixing means to visually record the force required to move said legs.

18. A testing apparatus comprising: a mixing bowl having a center post therein with a vertical axis; an arm above said post and rotatable about the axis of the post; a spider mounted on said arm for rotation about a second axis parallel to and spaced from the post axis a given distance, said spider having a plurality of downwardly projecting legs, each leg being spaced from the second axis a distance different than said given distance; power means connected to said arm and spider to rotate said arm about said post axis at one constant speed of rotation and to rotate said spider about said second axis at a different constant speed of rotation; and recording means connected to said power means to visually record the force required to rotate said arm and spider.

19. An apparatus as set forth in claim 18, wherein the speed of rotation of the spider is greater than the speed of rotation of the arm.

20. An apparatus as set forth in claim 19, wherein in said two speeds differ by a mixed number.

21. A testing apparatus comprising: a mixing bowl having a center post therein with a vertical axis; an arm above said post and rotatable about the axis of the post; a spider mounted on said arm for rotation about a second axis parallel to and spaced from the post axis a given distance, said spider having three, substantially vertical, downwardly projecting legs, said legs being spaced in the form of an equilateral triangle whose center coincides with said second axis, the distance between each leg and said axis being greater than said given distance; power means connected to said arm and spider to rotate said arm about said post axis at one constant speed of rotation and to rotate said spider about said second axis at a different constant speed of rotation; and recording means connected to said power means to visually record the force required to so rotate said arm and spider.

22. In a mixing apparatus for the testing of flour by mixing a predetermined quantity of dough and having a bowl for holding the dough, a power driven mixing element movable in a path in said bowl, and means for continuously measuring the force required to work the dough, the improvement comprising: the walls of said bowl being positioned a distance from said path such that the volume between the walls and the path is slightly greater than that of said quantity of dough.

23. In rheological testing apparatus: means for mixing a relatively small predetermined quantity of wheat flour dough to final dough breakdown, said mixing means including a mixing bowl having an upstanding center post and including a tri-leg mixing element, both the element and the legs having independent orbits respectively about said post, said legs being spaced from both the bottom surface of the bowl and the side surface of the bowl to permit escape of the dough from said legs and center post in dough breakdown; means for translating the rheological characteristics of the dough being mixed into variations in electrical output; and visually recording said variations.

24. Rheological testing means, comprising, a mixing bowl having a center post, a sweep arm, a motor for driving said sweep arm in rotation about an axis coaxial with that of said center post; a mixing element rotatably carried by the outer end of said sweep arm, said mixing element having legs adapted to rotate in said bowl about and intercalated with said post, an internal ring gear, a spur gear on the mixing element meshing with said ring gear, means for supporting said ring gear for limited rotational movement of the ring gear when resistance to rotation about its own axis of the mixing element is encountered, a loading spring reacting against said rotational movement of the ring gear, an electrical transducer for changing rotational movement of the ring gear to proportionately varied electrical output, and means for amplifying said electrical output for visually recording said variations on a strip chart graph.

25. The means of claim 24, wherein the mixing element has three legs.

26. The testing means of claim 24, wherein the loading spring has a spring rate of the order of 165 pounds per inch.

27. The testing means of claim 24, wherein the transducer is a variable linear differential transformer.

28. In a rheological testing means, a mixing bowl having a center post, a sweep arm, a motor for driving said sweep arm in rotation about an axis coaxial with that of said center post, a mixing element rotatably carried by the outer end of said sweep arm, said mixing element having legs adapted to rotate in said bowl about and intercalated with said post, a ring gear, a spur gear on the mixing element meshing with said ring gear, means for supporting said ring gear for limited rotational movement of the ring gear when resistance to rotation about its own axis of the mixing element is encountered, yieldable means reacting against said rotational movement of the ring gear, and an electrical transducer for changing rotational movement of the ring gear to proportionately varied electrical output.

29. The testing means of claim 28 wherein the legs are spaced from the bottom surface of the bowl, at all times, a distance no less than approximately 0.210 inch.

30. The testing means of claim 28, wherein the legs are spaced from the inner surface of the bowl, at all times, a distance no less than approximately 0.105 inch.

31. Rheological testing means, comprising a mixing bowl having a center post, a sweep arm, a motor for driving said sweep arm in rotation about an axis coaxial with that of said center post, a mixing element rotatably carried by the outer end of said sweep arm, said mixing element having legs adapted to rotate in said bowl about and intercalated with said post, an internal ring gear, a spur gear on the mixing element meshing with said ring gear, means for supporting said ring gear for limited rotational movement of the ring gear when resistance to rotation about its own axis of the mixing element is encountered, and means connected to the ring gear to yieldably resist rotation of the ring gear and to indicate the torque applied to the ring gear by the spur gear.

32. Rheological testing means, comprising a mixing bowl having a center post, a sweep arm, a motor for driving said sweep arm in rotation about an axis coaxial with that of said center post, a mixing element rotatably carried by the outer end of said sweep arm, said mixing element having legs adapted to rotate in said bowl about and intercalated with said post, an internal ring gear, a spur gear on the mixing element meshing with said ring gear, means for supporting said ring gear for limited rotational movement of the ring gear when resistance to rotation about its own axis of the mixing element is encountered, and means connected to the ring gear to yieldably resist rotation of the ring gear and to indicate the torque applied to the ring gear by the spur gear.

33. The method of measuring the characteristics of flour for use in the manufacture of cakes or the like, comprising the steps of: making a dough of flour, salt and a predetermined amount of water; centrifugally working said dough at a constant rate of pulling and stretching until the gluten fails completely; and measuring the changes in the force required to work the dough.

34. The method of claim 33, wherein the method is first carried out using predetermined quantities of salt, water and one flour and then is carried out using identical quantities of salt, water and a second flour.

35. A rheological testing apparatus comprising in combination: a testing and recording device and a device for controlling the ambient air conditions under which the test is performed; said testing and recording device including an open top bowl having a vertical center post therein, mixing means extending downwardly into said bowl and including three vertical legs spaced equal distances from each other, and power means to rotate said legs at a constant speed about said center post and simultaneously about an axis parallel to said center post, equi-distant between said legs, and closer to said center post than is the distance between said legs and said axis, and recording means connected to said mixing means to visually record the force required to move said legs; said device for controlling the ambient air conditions including a cabinet enclosing said mixing bowl, means to continuously withdraw air from said cabinet and to return air to said cabinet at a predetermined rate with the returned air having a predetermined temperature and humidity, the last means conditioning said supplied air by first cooling the air to a temperature below said predetermined temperature and reducing the moisture content thereof below that required to provide said humidity at said predetermined temperature, then reheating said air to said temperature and supplying said air with sufficient moisture in the form of water vapor to raise the humidity of said reheated air to said predetermined humidity.

36. An apparatus as set forth in claim 35, wherein said returned air is introduced into said cabinet from a point below said bowl and the air is withdrawn from said cabinet at a point above said bowl.

37. A rheological testing apparatus comprising in combination: a testing and recording device and a device for controlling the ambient air conditions under which the test is performed; said testing and recording device including an open top mixing bowl having a vertical center post therein, mixing means extending downwardly into said bowl and including three vertical legs spaced equal distances from each other, and power means to rotate said legs at a constant speed about said center post and simultaneously about an axis parallel to said center post, equi-distant between said legs, and closer to said center post than is the distance between said legs and said axis, and recording means connected to said mixing means to visually record the force required to move said legs; said device for controlling the ambient air conditions including a cabinet enclosing said mixing bowl, and means to continuously withdraw air from said cabinet and to return air to said cabinet at a predetermined rate with the returned air having a predetermined temperature and humidity, said supplied air being introduced into said cabinet from a point below said bowl and the air being withdrawn from said cabinet at a point above said bowl.

References Cited by the Examiner

UNITED STATES PATENTS

| | | |
|---|---|---|
| 2,048,137 | 7/36 | Palmer. |
| 2,974,524 | 3/61 | Loska _______________ 73—169 |
| 3,009,684 | 11/61 | Munters _______________ 165—3 |

FOREIGN PATENTS 200,366  10/58  Austria.

RICHARD C. QUEISSER, *Primary Examiner.*